United States Patent [19]

Imanishi

[11] Patent Number: 4,604,705

[45] Date of Patent: Aug. 5, 1986

[54] NUMERICAL CONTROL MACHINING METHOD AND SYSTEM THEREFOR

[75] Inventor: Kazuo Imanishi, Aichi, Japan

[73] Assignee: Mitsubishi Denki Kabushiki Kaisha, Tokyo, Japan

[21] Appl. No.: 566,937

[22] Filed: Dec. 29, 1983

[30] Foreign Application Priority Data

Dec. 29, 1982 [JP] Japan .............................. 57-232287

[51] Int. Cl.$^4$ ............................................ G06F 15/46
[52] U.S. Cl. .................... 364/474; 318/563; 364/167
[58] Field of Search ................. 364/167–171, 364/474, 475, 184, 550, 551; 318/563, 565

[56] References Cited

U.S. PATENT DOCUMENTS

| | | | |
|---|---|---|---|
| 4,131,836 | 12/1978 | Noda | 364/474 X |
| 4,442,493 | 4/1984 | Wakai et al. | 364/475 |
| 4,481,568 | 11/1984 | Inaba et al. | 364/474 X |
| 4,482,968 | 11/1984 | Inaba et al. | 364/167 X |
| 4,489,377 | 12/1984 | Mawyer et al. | 364/474 X |

Primary Examiner—Joseph Ruggiero
Attorney, Agent, or Firm—Sughrue, Mion, Zinn, Macpeak, and Seas

[57] ABSTRACT

A numerical control machining method in which plural machining operations, such as drilling and tapping, are performed by a unified machining cycle command, which is unified from several separate rotation/positioning commands for the workpiece and machining cycle commands, such as for controlling drilling operations. Also, a safety route of the tool from a rest position to the position at which a machining operation is to be started is automatically created from a knowledge of the configuration of the workpiece, the rest position of the tool, and the position at which the machining operation is to be performed. Programming of a numerically controlled machine tool can be performed in accordance with the invention without the need of a high level of programming skill.

17 Claims, 12 Drawing Figures

N 8  G77 X $x_3$ Z $z_3$ D d F f * ⎫
                                    ⎪
                                    ⎬ REPEAT DESIRED NUMBER OF MACHININGS
                                    ⎪
N $n_1$  M $m_2$ *                  ⎪
                                    ⎪
N $n_2$  G77 X $x_3$ Z $z_3$ D d F f * ⎭

N $n_3$  G00 X $x_1$ Z $z_1$  M05 *

N $n_4$  M02 *

NUMERICAL CONTROL MACHINING METHOD AND SYSTEM THEREFOR

BACKGROUND OF THE INVENTION

The present invention relates to a numerical control machining method used to carry out machining of workpieces by controlling a machine tool with the use of a numerical controller. More particularly, the invention relates to a numerical control machining method which achieves machining by controlling rotary tools with the use of a numerical controller.

In a conventional numerical control machining method, a machine tool is moved relative to a workpiece by instructions given in the form of numerical information. Accordingly, with the use of a numerically controlled machine tool, it is easily possible to machine workpieces of complicated configurations with a great accuracy, thereby attaining a high productivity.

Generally, a numerical control machining system is constructed as shown in FIG. 1. The system includes a numerical controller 120 for computing numerical control data in response to commands received from an external device through a terminal 110. A machine tool 130 is controlled by the numerical control data produced by the numerical controller 120. The numerical controller includes an input unit 121 for receiving commands from an external device, a processor unit 122 for processing the commands from the input unit 121, a memory unit 123 for storing the processed results from the processor unit 122 as well as commands from the input unit 121 and the like, a control unit 124 for controlling the operation of the processor unit 122, and an output unit 125 for outputting the processed information as instructions to directly control the machine tool 130. The machine tool 130 includes a rotary tool 131 mounted on a tool holder 132, with the tool holder 132 being received by the chuck of a spindle 133. The spindle 133 is rotated by motor 134, which is driven by a signal from the output unit 125 of the numerical controller 120. Further, a workpiece 140 is fixed on a table 135 by a jig or the like. In FIG. 1, reference numeral 136 indicates a lead or ball screw for moving the table 135 in the X-axis direction, with the lead screw 136 being driven by an X-axis feed motor 138 via a gear box 137. In turn, the X-axis feed motor 138 is driven by a signal from the output unit 125 of the numerical controller 120. Similarly to the arrangement where the table 135 is moved in the X-axis direction by the X-axis driving or feed motor 138 and the lead screw 135, there are provided mechanisms (not shown) for moving the table 135 in the Y- and Z-axis directions by signals from the numerical controller 120.

As mentioned above, the invention relates to a numerically controlled rotary-type machine tool. For convenience of explanation, it is assumed that a lathe is employed including a drill and a cutting tool.

FIG. 2 is a diagram showing a lathe of a type to which the invention can be applied. In FIG. 2, reference numeral 1 indicates a spindle assembly, 2 a chuck, 3 a workpiece, 4 a tool support, 5 a rotary tool or drill, and 6 a cutting tool.

To conduct a machining operation, the workpiece 3 is mounted with the chuck 2 at a predetermined position. The tool support 4 then selects, for instance, the rotary tool 5, after moving the rotary tool 5 into the appropriate position, so that the tip of the rotary tool 5 will meet a predetermined start point on the workpiece 3 when it is advanced. The tool 5 is rotated at a predetermined speed. The tool 5 is then moved forwardly by the tool support 4 to cut the workpiece 3. After the workpiece 3 has been drilled to a given depth, the tool support 4 is moved rearwardly, returning the rotary tool 5 to the machining start point, whereby one drilling operation has been completed.

If n holes a, b, ... n are to be formed in the workpiece 3 at positions as shown in FIGS. 3a and 3b, a conventional numerically controlled system was typically operated in accordance with a machining program such as shown in FIG. 4. In this program, at step N1, a command T t1 t2 t3 t4 * is first employed to select the desired tool. Next, at N2, a command G50 X x1 Z z1 * is issued to select a work coordinate system for the tool. At step N3, a command M03 S s1 s2 s3 * is employed to designate the direction of rotation of the tool and the rate of rotation of the tool, and also to start the rotation of the tool. The following command of G00 X x2 Z z2 * at step N4 is utilized to position the workpiece to the predetermined machining start point. At N5, the command M m1 * positions the tool at a given rotational angle $\theta_0$. Then, the command G77 X x3 Z z3 Dd Ff * at step N6 effects the start of the machining of the workpiece 3. In this step, x3 z3 indicates the coordinates of the terminal point, that is, the farthermost position of the tip of the rotary tool. The factor d indicates the amount of incremental movement of the tool support and rotary tool, and f the incremental speed of the tool.

Using the step described above, a machining operation for a first hole is completed. Next, the rotation/positioning command M m2 * at step N7 causes the workpiece 3 to be rotated through an angle of $\theta_1$, thereby positioning the workpiece 3 so that the rotary tool will, when advanced, then be properly positioned to form the second hole. By repeating the drilling cycle command G77 ... * at step N8 and the rotation/positioning command M m2 * and the steps there between, a total of n drilling operations is effected. Once the n drilling operations have been completed, at step N n3, a command G00 X x1 Z z1 M05 * is employed to return the tool 5 to its initial position, to stop the rotation of the tool, and to terminate the machining operation.

As is believed clear from the foregoing description, in the conventional machining method employing a conventional program, it is necessary to provide rotation-instructing and position-instructing commands for the workpiece 3 and the rotary tool 5 for each hole to be formed. Further, it is necessary to program the entire route of the tool, after fully considering the positional relationship between the workpiece 3 and the tool 5. Hence, a great deal of programming skill was required, and much time was needed to compile the operating program in such a conventional system.

Accordingly, it is an object of the present invention to provide a numerically controlled machining method in which the above-discussed drawbacks are eliminated.

More specifically, it is an object of the present invention to provide a numerical control machining method whereby plural drilling operations can be effected with a single machining command, which incorporate therein several rotation and positioning commands for the workpiece and for the drilling operation.

It is a further specific object of the invention to provide a numerical control machining method in which the machining program can be easily prepared, even by one having no particular programming skills.

A still further object of the invention is to provide a numerical control machining method which permits the machining operation to be completed within a shorter period of time than was possible with prior approaches.

SUMMARY OF THE INVENTION

In accordance with the above and other objects of the invention, there is provided a numerical control machining method by which machining is performed using rotary tools mounted on a movable tool support. In accordance with this method, a machine program processor unit utilizes machine cycles which are unified from rotation/positioning commands for a workpiece and machining cycle commands which move the tool from its rest point up to the machining point based upon the configuration of the workpiece to be machined. Machining can be performed at plural locations by determining a routing of the tool and the machining location using internal information processing.

BRIEF DESCRIPTION OF THE DRAWINGS

FIG. 4 shows a conventional machining program;

DESCRIPTION OF THE PREFERRED EMBODIMENTS

The invention now be described in more detail with reference to the drawings.

Figure 2:
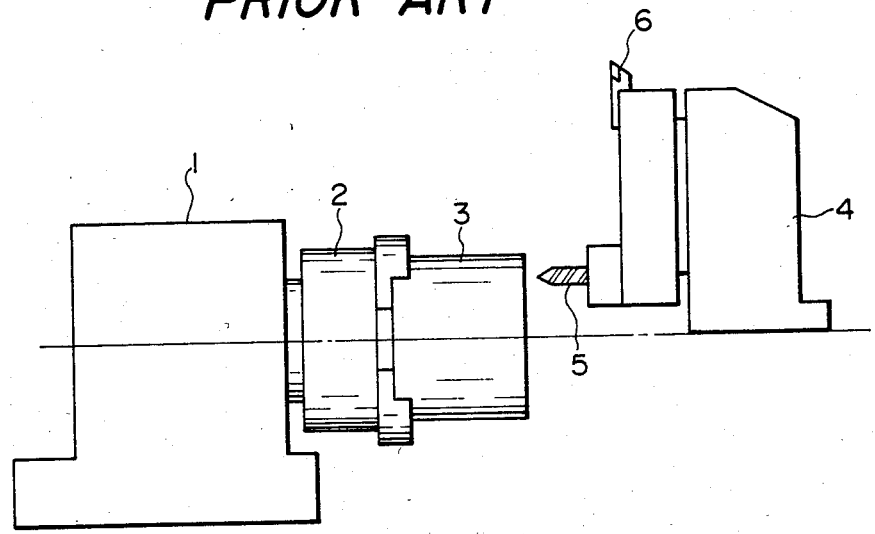
FIG. 2 is a side view showing the arrangement of a lathe including a rotary tool.

A numerical control machining method according to the invention is here assumed to be applied to a lathe having an arrangement as shown FIG. 2. Of course, the invention can be applied to other machine arrangements as well.

Figure 1:
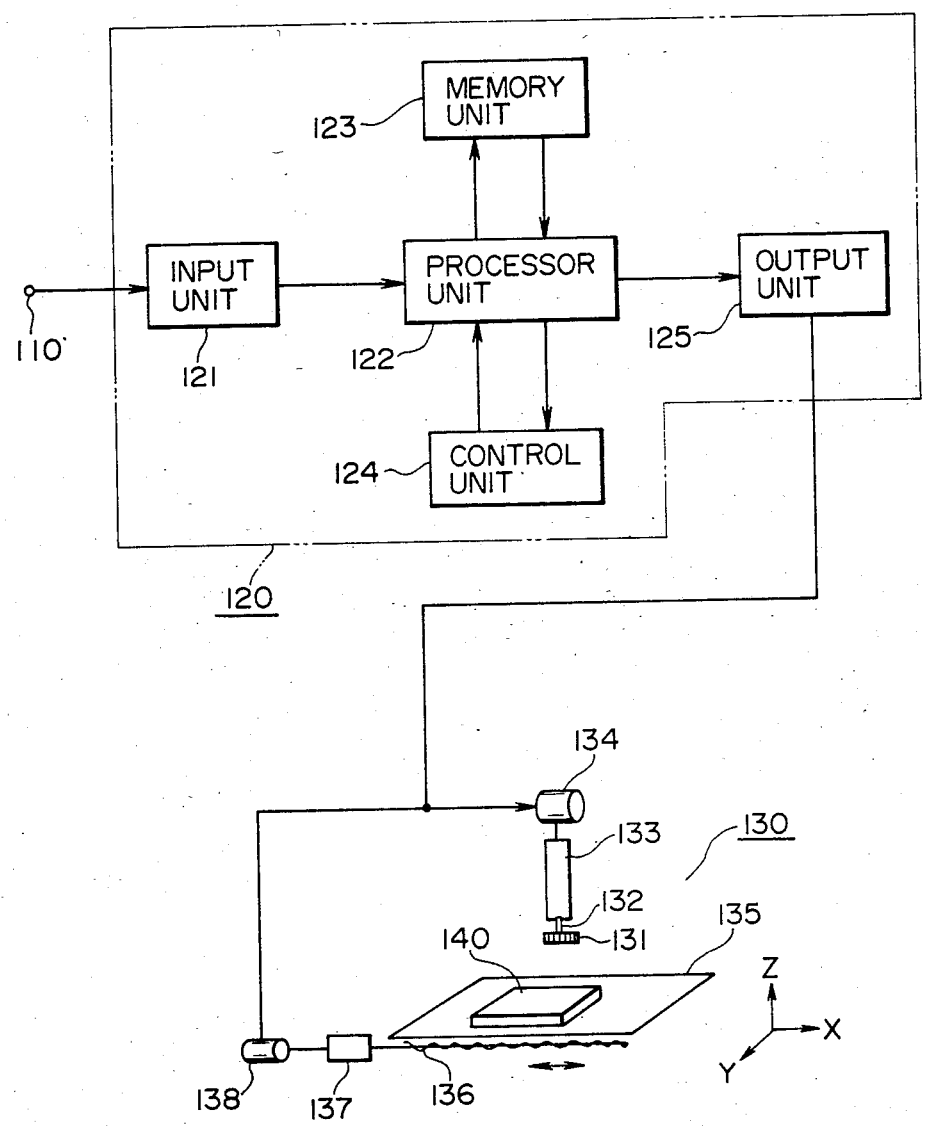
FIG. 1 is a diagram showing the arrangement of a numerically controlled machine tool.
Figures 5A, 5B:
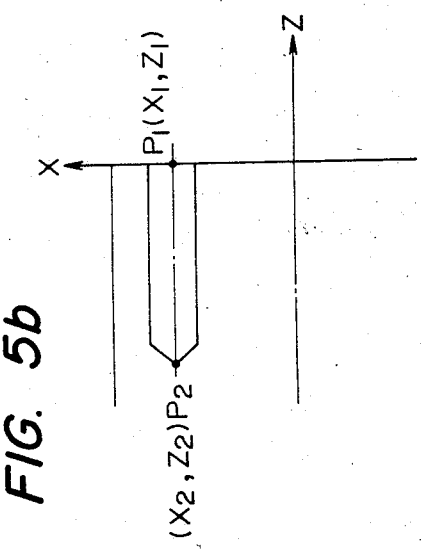
FIG. 5a is a drawing of a display used in the invention.
FIG. 5b is a diagram used for explaining a start point and a terminal point of a machining operation.

Referring to FIG. 5a, there is shown therein a display pattern which can be displayed on a display unit and which represents a machining program and method according to the invention. FIG. 5b is a side view of a workpiece used for explaining the location of a machining start point $P_1$ ($x_1$, $z_1$) and a machining terminal point $P_2$ ($x_2$, $z_2$). The pattern of FIG. 5a can be displayed upon a cathode-ray tube or the like which forms a part of the numerical controller 120 as depicted in FIG. 1. More particularly, as is well-known in the art, a cathode-ray tube display associated with a numerical controller can display input information from the input unit 121, processing results produced by the processor unit 122, the machining program, and other information of this sort.

In FIG. 5a, "PNo." in the displayed image indicates a process number. In accordance with the invention, the machining program for operating the rotary tool can be executed in combination with a normal cutting program, and the programming changes the process number for each machining mode. Although the example herein discussed with reference to FIG. 5a relates to a drilling operation, other machining modes can easily be used.

Figure 6:
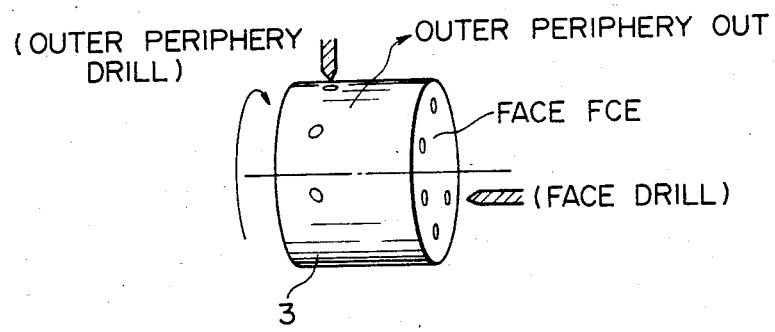
FIG. 6 is a side view illustrating possible machining locations on in workpiece.

The "MODE" column in FIG. 5a indicates the present operating mode. In the example herein under discussion, "MDRL" is displayed in the "MODE" column to indicate that a drilling mode has been selected for the rotary tool 5. Additionally, in accordance with the invention, besides the drilling mode "MDRL", modes such as "MTAP" indicating a tapping mode, "MILL" for indicating a keyway machine mode, and the like, can be employed. The tapping mode is used to form a hole by drilling then tapping the drilled hole to form a screw thread. The keyway machining mode is used to form a keyway in the face of the workpiece or on a peripheral portion thereof. In either of these modes, an angle relative to a reference position on the circumference of the workpiece and a pitch angle are designated, and plural machining positions are instructed. The "MACHINING PORTION" column designates the portion of the workpiece 3 which is to be machined. As an example, "FCE" indicates the face of the workpiece 3 is to be machined. Furthermore, for instance, the outer periphery of the workpiece 3 can be designated by "OUT". As shown FIG. 6, with the "FCE" designation, the face of the workpiece can be machined by a facing drill, and with "OUT", the outer periphery can be machined by an outer periphery drill.

Figure 7:
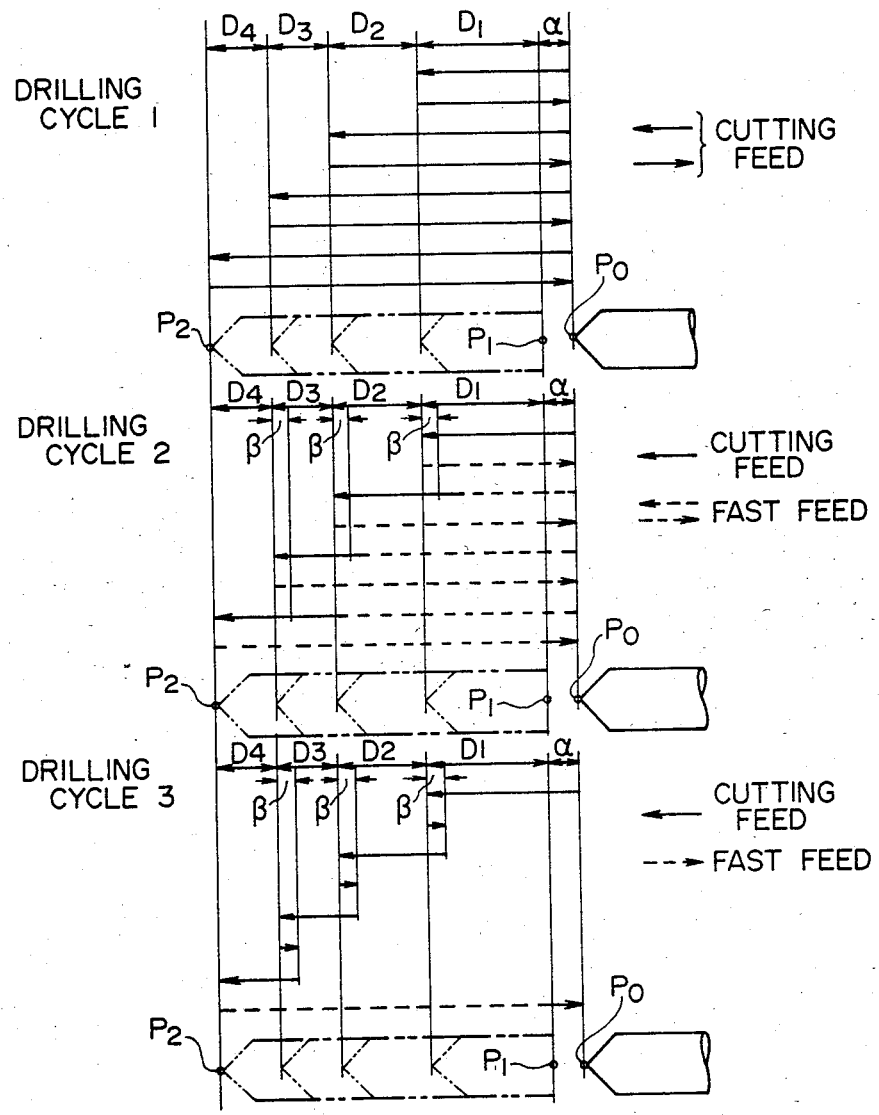
FIG. 7 is a diagram showing possible machining patterns which can be utilized in a drilling cycle.

The "CLASS" column designates the class of the drilling operation to be performed. Three drilling cycles or Classes 1, 2 and 3 are indicated in FIG. 7. One of these, for instance, is designated in the "CLASS" column. The "DRILL" diameter column designates the diameter to be used in the drilling operation. The "INFEED" column designates the initial amount of incremental feeding $D_1$ for drilling.

With reference now to FIG. 7, Class 1 of the classes shown therein is used for machining in which the drill is retracted and returned to its starting position each time at a speed equal to the feeding speed, and the drill tip is pulled out from the workpiece once and then advanced toward the workpiece to cut the workpiece to a predetermined depth. Class 2 differs from Class 1 in that the return movement to the start point is effected by a single quick motion. In Class 3, the drill does not return to the initial start point, but backs up through a short distance B, and then moves forwardly to perform a next subsequent drilling operation.

Referring back to FIG. 5a, "ANGLE 1" designates a positioning $\theta_o$ for the rotary shaft of workpiece 3, that is, the angle of the chuck holding the workpiece 3 relative to a reference angle. "ANGLE 2" designates pitch angle $\theta_1$ needed for performing plural machining operations. "NUMBER" designates the number of holes to be made. "V" indicates the peripheral speed to be used during the machining. By "PERIPHERAL SPEED" is meant the machining speed during the cutting operation, namely, the relative velocity between the cutting tip of the tool and the periphery of the workpiece, which speed is dependent upon the rate of rotation of the cutting tool and of the workpiece. Generally, the optimum value for the peripheral speed should be determined taking into account the type of cutting tool and the material of the workpiece. It is necessary to designate this peripheral speed in order to determine the rate of rotation of the drill. More specifically, the rate of rotation of the drill can be obtained from the following equation:

$$\text{rate of rotation (r.p.m.)} = \frac{\text{peripheral speed (m/min)} \times 100}{\pi \times \text{drill diameter}}.$$

"FEED" designates the feeding speed of the tool. "GEAR" designates the number of the gear stage to be employed. Ordinarily, several gear stages are employed between the rotary tool and its drive motor and it is possible to select thereamong, and hence it is necessary to designate which gear stage is to be used. For example, in the case of three gear stages, gears 1 to 3 may provide drive motor-tool gear ratios of 3:1, 1.5:1 and 1:1, respectively. "T" in FIG. 5a designates the number of the rotary tool to be used.

The next line of the display indicates data which describes the machining position. The combination of the "START POINT X" and "START POINT Z" designates the coordinate $P_1$ of the hole to be formed in the workpiece. The combination of the "TERMINAL POINT X" and the "TERMINAL POINT Z" designates the coordinates $P_2$ of the terminal point of the hole.

Figure 8:
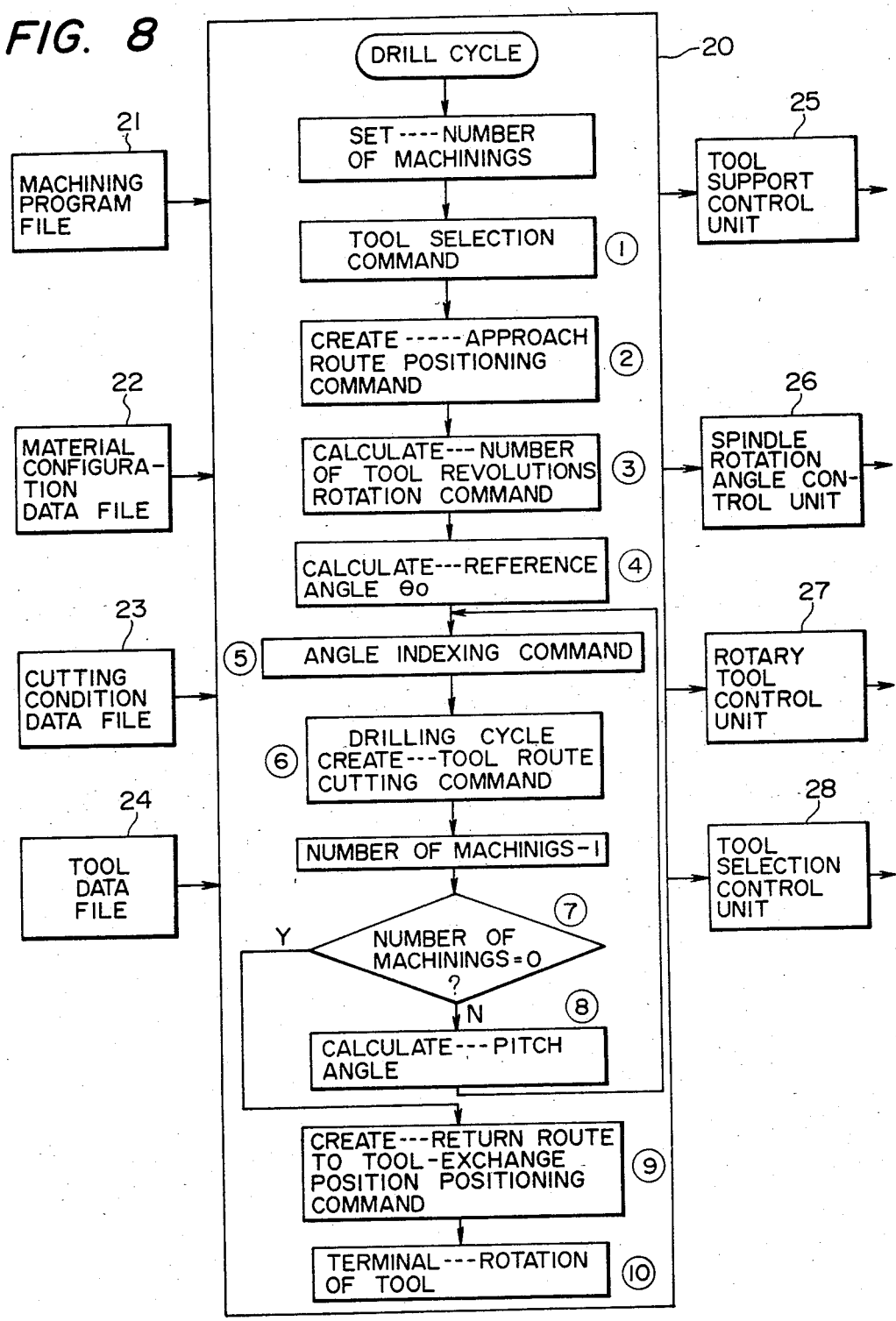
FIG. 8 is a flow chart showing a machining method of the invention.

FIG. 8 is a flow chart which describes in detail an example of a machining method of invention. In FIG. 8, a machining program processor unit 20, which operates in response to the received machining program, creates sequences of machining commands, applying the commands to respective control units. A machining program file 21 stores the received machining programs. A material configuration data file 22 is used for storing data corresponding to the configuration of the workpiece to be machined. A cutting condition data file 22 stores, for each machining mode, values of peripheral speed, feeding, in-feeding, and the like, used for determining cutting conditions. A tool data file 24 stores, for each tool in the tool inventory, an amount of compensation, a direction of rotation, an expected tool lifetime, and other such information. Reference numeral 25 designates a tool support control unit which controls the position of the tool support 4 and its speed in response to commands received from the machining program processor unit 20. Further, reference numeral 26 designates a spindle rotation angle control unit used to control the rotational angle of the spindle assembly 1 holding the workpiece 3 in response to commands received from the machining program processor unit 20. A rotary tool control unit 27 is employed for controlling the rate of rotation of the tool 5, again in response to commands received from the machining program processor unit 20. A tool selection control unit 28 selects from among the available tools, also in response to commands from the machining program processor unit 20.

The displayed pattern of FIG. 5a is an example of a display pattern when the program preparation mode is selected, which may be done via a keyboard or the like. In the program preparation mode, the machining program is entered into the system in a predetermined format. FIG. 5a illustrates the state of the programing entry in which the mode "MDRL" has been entered and the remaining blank data areas are ready to receive data entered by a keyboard. The column titles above the data areas are automatically displayed upon entry of "MDRL". All entered data is stored in the machine program file 21 indicated in FIG. 8.

The data stored in the material configuration data file 22 of FIG. 8 is entered at the start of the machine program. This data describes the configuration of the workpiece to be machined as is used for controlling the movement of the cutting tool toward and away from workpiece. The data stored in the cutting condition data file 23 is entered separately from the machining program. This data includes the peripheral speed, the infeeding (cutting speed) and feeding speed corresponding to the respective workpiece machining modes. Data is entered into the tool data file 24 corresponding to the particular tools which are available on the tool support. The entries in the tool data file 24 include the direction of rotation, the amount of the compensation, the size of the tools, the expected tool lifetime, and the like, in correspondence with the respective available tools.

Figure 3A:
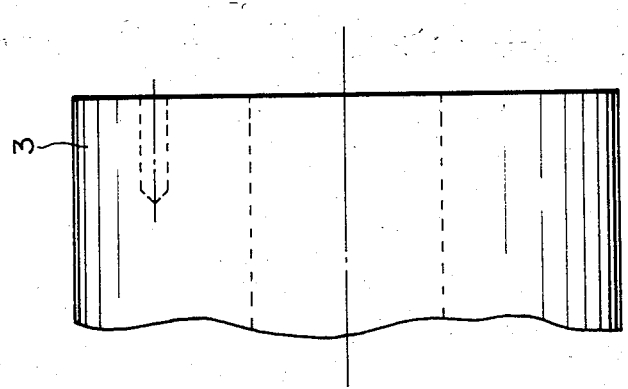
FIGS. 3a and 3b are respective side and end views of a workpiece upon which exemplary machining operations have been performed with the use of a rotary tool.
Figure 3B:
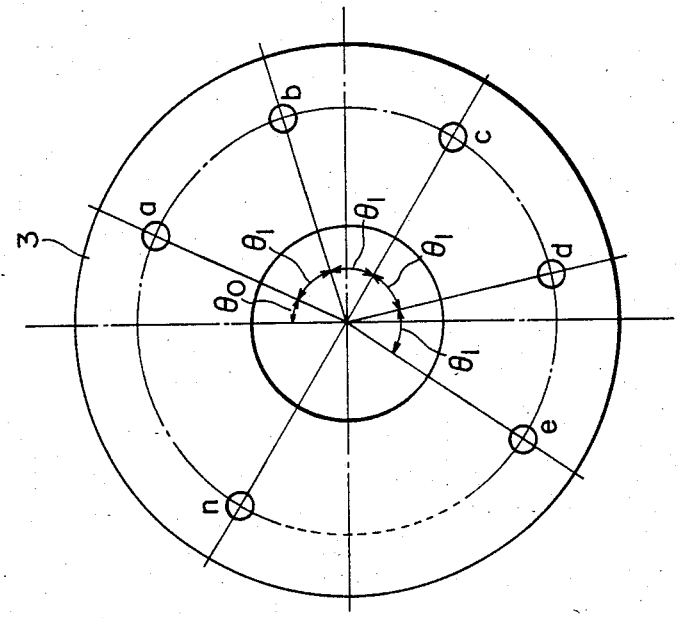
Figure 9A:
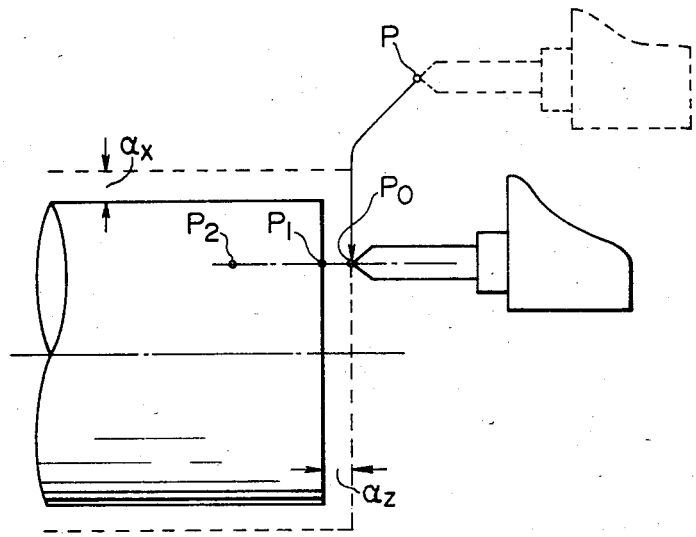
FIGS. 9a and 9b are side views showing routes of approach of the machining tool to the workpiece in accordance with the method of the invention.
Figure 9B:
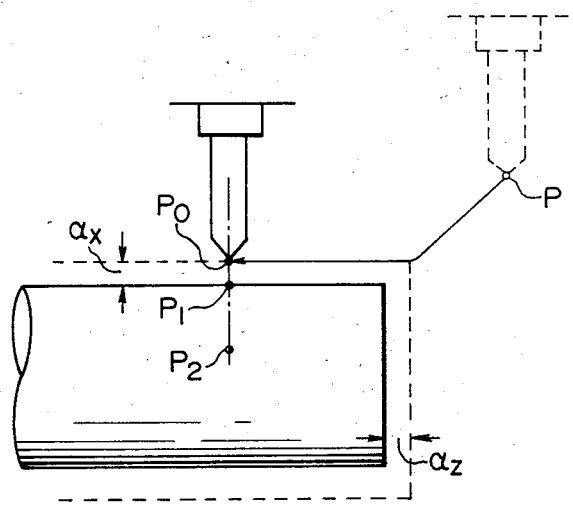

Next, an operation of forming holes a, b, ... n in the peripheral portion of the workpiece 3 as indicated in FIG. 3 will be described as an example. After the data indicated in FIG. 5a has been entered, the machining programing processor unit 20 refers to the tool number designated by the machining program, transfers the tool selection command (1 in FIG. 8), and selects the desired rotary tool (the drill). Then, the processor unit refers o the material configuration data file 22 and machining program file 21 to create an approach route for the machining tool toward the machining start point. It then transfers the feeding command (position and speed) to the tool support control unit 25 (2 in FIG. 8) and moves the tool support 4 to the approach point $P_o$. The approach route P to $P_o$ is formed in such a way that the tool support moves along a "safety zone" defined by safety clearances $a_z$, $a_x$ derived from the material configuration data as shown in FIGS. 9a and 9b. The processor unit then refers to the machining program file 21 and transfers the data describing the rotational position of the workpiece 3 to the spindle rotational angle control unit 26 as an angle command, hence causing the workpiece 3 to be positioned to be given rotational position. Subsequently, the processor unit, referring to the machine program file 21, the cutting condition data file 23, and the tool data file 24, computes the direction of rotation and the rate of rotation of the rotary tool 5, and transfers the rotation data as a rotation command to the rotary tool control unit 27 (3 in FIG. 8) to effect the rotation of the tool 5. Then, the processor unit refers to the machining program file 21 and the cutting condition data file 23, from the entries of which it computes the reference angle $\theta o$ as shown in FIG. 3, indexes this angle (at 4 and 5 in FIG. 8), and determines the route for the tool to start the drilling operation and the feeding speed (at 6 in FIG. 8), and transfers the feeding command to the tool support control unit 25, commencing a drilling cycle. At this point, because there are three machining patterns, that is, drilling Classes, 1, 2 and 3, as shown in FIG. 7), the processor unit refers to the machining program file 21, creates a tool route sequentially in accordance with the designated class of machining pattern, and transfers the tool route data to the tool suppport control unit 25. In FIG. 8, "P" indicates the position for tool exchange.

Subsequently, the processor unit refers to the number of machining operations designated in the machining program file 21, computes the pitch angle $\theta_l$ if plural machining operations are to be performed (see 7 and 8 in FIG. 8), transfers the next rotational position of the workpiece 3 to the spindle rotational angle control unit 26 as an angle command at (5 in FIG. 8), and thus positions the workpiece 3 to a predetermined rotational position. The number of machining operations remaining to be performed is computed on the basis of the initial number of machining operations and information stored in the machining program file 21. Until the number of remaining machining operations is reduced to zero, indexing of the rotational position of the workpiece 3 and repetitions of the drilling cycle are repeatedly performed in the same manner described above.

When the number of remaining machine operations reaches zero, the processor unit refers to the material configuration data file 22, and therefrom creates a tool route from the last position of the tool to the tool exchange position P, transferring this data to the tool support control unit 25 (at 9 in FIG. 8), thereby causing the tool support 4 to move back to the tool exchange position P. In this operation, a safety zone is provided for the tool return route, taking into consideration the configuration of the material to be machined plus safety clearances therearound. The rotation of the rotary tool 5 is then stopped, finishing the machining operations.

As mentioned previously, although the foregoing description relates to a drilling operation performed on the face of the workpiece 3, such operations can equally be applied to the machining of the periphery of the workpiece 3. Furthermore, with the use of the invention, machining cycle commands can be created which instruct tapping and milling operations, with the same advantages as attained in the above-described embodiment.

As described above, in accordance with the numerical control machining method of the invention, a unified machining cycle is employed, which machining cycle is a result of unifying workpiece rotation/positioning commands and machining cycle commands. Further, a safety route is created along which the tool is moved to the point on the workpiece where the machining operation is to be commenced. Furthermore, plural machining operations can be performed at plural positions with the cutting route of the tool and the machining position being determined through internal computations. Thus, a machining program employed with the method of the invention can easily be prepared in a short time by one having but very little skill in the programming art. Also, machining operations with the method of the invention can be carried out in a very short period of time.

I claim:

1. A numerical control machining method of a type in which a workpiece can be machined at plural positions by one or more rotary tools mounted on a movable tool support, comprising the steps of:
   (a) entering data describing a configuration of a workpiece to be machined, a machining mode for the machining workpiece, and machining data for machining program execution in correspondence with said machining mode;
   (b) computing a safety route of a selected rotary tool from a rest position to a machining start point on said workpiece based upon said data describing said configuration of said workpiece and in accordance with said machining program;
   (c) computing a rotation/positioning command for said workpiece with said machining program in response to said machining data;
   (d) computing a machining command in response to said machining mode and rotation/positioning command;
   (e) repeating said steps (c) and (d) a number of times corresponding to a number of portions of said workpiece to be machined; and
   (f) controlling said tool support, said workpiece, and said rotary tool in accordance with said steps (b) to (e).

2. The numerical control machining method as claimed n claim 1, wherein, in said step (b), said safety route includes a predetermined safety clearance around said workpiece.

3. The numerical control machining method as claimed in claim 2, wherein said machine tool is a lathe.

4. The numerical control machining method as claimed in claim 3, wherein said tool support carries plural rotary tools and cutting tools.

5. The numerical control machining method as claimed in claim 1, wherein said rotary tool is a drill and said machining mode is a drilling mode.

6. The numerical control machining method as claimed in claim 5, wherein said machining data includes the rotational angle from a reference axis to a machining start point, a pitch angle from said start point, a number of machining operations, and coordinates of said machining start point and a terminal point.

7. The numerical control machining method as claimed in claim 6, wherein said machining data includes coordinates of a point at which machining is to be commenced.

8. The numerical control machining method as claimed in claim 7, wherein said position at which said machining is to be commenced is on a face portion of said workpiece.

9. The numerical control machining method as claimed in claim 7, wherein said position at which machining operation is to be commenced is on a peripheral portion of said workpiece.

10. The numerical control machining method as claimed in claim 6, wherein said machining data includes plural classes of drilling operations.

11. The numerical control machining method as claimed in claim 10, wherein each of said classes of drilling operations includes combinations of fast feeding and cutting feeding of said drill.

12. The numerical control machning method as claimed in claim 6, wherein said step (f) of controlling comprises controlling a shaft of said tool support, controlling a rotational angle of a spindle on which said workpiece is mounted, and controlling a rate of rotation of said tool.

13. The numerical control machning method as claimed in claim 12, wherein said step (b) of computing said safety route of said tool comprises applying a command to control a shaft of said tool support.

14. The numerical control machining method as claimed in claim 13, wherein said step (c) of computing said rotation/positioning command comprises applying a command to control a rotational angle of a spindle upon which said workpiece is mounted.

15. The numerical control machining method as claimed in claim 14, wherein step (d) of computing a machining command comprises applying commands to control a shaft of said tool support and to control operations of said rotary tool.

16. The numerical control machining method as claimed in claim 1, wherein said rotary tool is a tap and said machining mode is a tapping mode.

17. A numerical control machining system of a type in which a workpiece can be machined at plural positions by one or more rotary tools mounted on a movable tool support, comprising:
   (a) means for entering data describing a configuration of a workpiece to be machined, a machining mode for the machining workpiece, and machining data for machining program execution in correspondence with said machining mode;
   (b) first computing means for computing a safety route of a selected rotary tool from a rest position to a machining start point on said workpiece based upon said data describing said configuration of said workpiece and in accordance with said machining program;
   (c) second computing means for computing a rotation/positioning command for said workpiece with said machining program in response to said machining data;
   (d) third computing means for computing a machining command in response to said machining mode and rotation/positioning command;
   (e) repeating means for repeating the computations of said second and third computing means a number of times corresponding to a number of portions of said workpiece to be machined; and
   (f) controlling means for controlling said tool support, said workpiece, and said rotary tool in accordance with said means (b) to (e).

* * * * *